United States Patent
Stramel et al.

(10) Patent No.: US 12,491,224 B2
(45) Date of Patent: Dec. 9, 2025

(54) COMPOSITION FOR HYDRATION AND REDUCING THE EFFECTS OF ACOHOL

(71) Applicant: Manna Health LLC, San Diego, CA (US)

(72) Inventors: Rodney D. Stramel, San Diego, CA (US); Jeff Hill, San Diego, CA (US)

(73) Assignee: Manna Health LLC, San Diego, CA (US)

(*) Notice: Subject to any disclaimer, the term of this patent is extended or adjusted under 35 U.S.C. 154(b) by 297 days.

(21) Appl. No.: 18/235,817

(22) Filed: Aug. 19, 2023

(65) Prior Publication Data

US 2024/0100114 A1    Mar. 28, 2024

Related U.S. Application Data

(60) Provisional application No. 63/410,151, filed on Sep. 26, 2022.

(51) Int. Cl.
| | | |
|---|---|---|
| *A61K 31/357* | (2006.01) | |
| *A61K 9/00* | (2006.01) | |
| *A61K 31/198* | (2006.01) | |
| *A61K 31/352* | (2006.01) | |
| *A61K 31/4415* | (2006.01) | |
| *A61K 31/685* | (2006.01) | |
| *A61K 31/714* | (2006.01) | |
| *A61K 33/00* | (2006.01) | |
| *A61K 33/14* | (2006.01) | |
| *A61K 36/185* | (2006.01) | |
| *A61K 36/33* | (2006.01) | |
| *A61K 47/02* | (2006.01) | |
| *A61K 47/10* | (2017.01) | |
| *A61K 47/12* | (2006.01) | |
| *A61K 47/26* | (2006.01) | |

(52) U.S. Cl.
CPC ............ *A61K 36/33* (2013.01); *A61K 31/198* (2013.01); *A61K 31/352* (2013.01); *A61K 31/4415* (2013.01); *A61K 31/685* (2013.01); *A61K 31/714* (2013.01); *A61K 33/00* (2013.01); *A61K 33/14* (2013.01); *A61K 36/185* (2013.01); *A61K 47/10* (2013.01); *A61K 47/12* (2013.01); *A61K 47/26* (2013.01)

(58) Field of Classification Search
CPC .... A61K 36/33; A61K 31/198; A61K 31/352; A61K 31/4415; A61K 31/685; A61K 31/714; A61K 33/00; A61K 33/14; A61K 36/185; A61K 47/10; A61K 47/12; A61K 47/26; A61K 9/0095; A61K 36/28; A61K 36/736; A61K 47/02; A61K 47/544; A61K 31/357
See application file for complete search history.

(56) References Cited

U.S. PATENT DOCUMENTS

| | | | |
|---|---|---|---|
| 2015/0342923 A1* | 12/2015 | Powell | A61K 31/353 514/452 |
| 2020/0022949 A1* | 1/2020 | Davis | A61K 31/353 |
| 2022/0202768 A1* | 6/2022 | Prud'Homme | A61K 9/107 |

OTHER PUBLICATIONS

Liu et al. (Trends in Food Science & Technology 91 (2019) 586-597) (Year: 2019).*

* cited by examiner

*Primary Examiner* — Ernst V Arnold
(74) *Attorney, Agent, or Firm* — Gordon Rees Scully & Mansukhani, LLP

(57) ABSTRACT

A composition to provide increased hydration and to counteract the effects of alcohol. The composition includes about 10% by weight of sunflower lecithin powder; about 2.5% by weight N-acetyl cysteine; about 1.9% by weight prickly pear cactus; and about 2.5% by weight dihydromyricetin in combination with electrolytes, sugar, and water.

18 Claims, No Drawings

COMPOSITION FOR HYDRATION AND REDUCING THE EFFECTS OF ACOHOL

CROSS-REFERENCE TO RELATED APPLICATION

This application claims priority to and the benefit of U.S. Provisional Patent Application No. 63/410,151, filed Sep. 26, 2022, which is incorporated by reference herein in its entirety.

GENERAL DESCRIPTION

Alcohol consumption has played a significant role in human societies for centuries, encompassing cultural, social, and recreational aspects. Ethanol, the active ingredient in alcoholic beverages, elicits profound effects on the human body upon ingestion. Excessive alcohol intake may give rise to a spectrum of adverse effects on various physiological systems. For example, the liver is responsible for breaking down alcohol, but drinking too much may cause inflammation and damage to the liver. Other organs in the body may also be affected. Another effect of ethanol on the body is dehydration. This application discloses specific substances that may be utilized to mitigate or even prevent these effects.

This application is directed to compositions and methods for counteracting the effects of alcohol consumption, while increasing hydration. The application discloses compositions for reducing effects of alcohol consumption including dihydromyricetin (DMH), prickly pear cactus (nopal), and N-Acetyl L-Cystine (NAC) in combination with electrolytes, sugar, and water. The composition also employs a liposomal solution to, amongst other benefits, improve absorption of the ingredients of the composition by the body.

Alcohol consumption may have significant consequences on the human body, ranging from acute intoxication to potential organ damage. An alcoholic beverage typically includes ethanol, which may also be known as ethyl alcohol. Ethanol may cause dehydration because ethanol inhibits the production of the antidiuretic hormone vasopressin (ADH). Water may provide relief to improve hydration but, at present, there is not a composition available that will improve hydration while, at the same time, reducing the potentially detrimental effects of alcohol on the body. Thus, there remains a need for such a composition.

SUMMARY

The present application discloses embodiments of a composition for improving treatments counteracting the effects of alcohol consumption, while increasing hydration.

According to one embodiment, the exemplary composition may include three active ingredients: dihydromyricetin (DMH), prickly pear cactus (nopal), and N-Acetyl L-Cystine (NAC) to help counter the effects of alcohol consumption. Incorporating these specific compounds into formulations may aid in mitigating hangover symptoms and supporting overall well-being According to an exemplary embodiment, the composition may also include electrolytes and sugar to counter the effects of dehydration.

According to an exemplary embodiment, the composition may include a liposomal solution that may include sunflower lecithin containing phosphatidic choline that forms the liposomes to increase bioavailability and absorption.

A liposome is a spherical-shaped vesicle that is composed of one or more phospholipid bilayers, which closely resembles the structure of cell membranes. The ability of liposomes to encapsulate hydrophilic or lipophilic drugs have allowed these vesicles to become useful drug delivery systems. There is clear research showing the advantages of using a liposomal for drug delivery, such as better bioavailability and delivery to cells, increased absorption, and convenience for consumers.

As used herein, the percentage (%) refers to the ratio of ingredients in weight.

In one embodiment, an exemplary composition includes 2.5% dihydromyricetin (DMH), 1.9% prickly pear cactus (nopal), and 2.5% N-Acetyl L-Cystine (NAC).

The present application discloses an exemplary composition including a combination of products (dihydromyricetin (DMH), prickly pear cactus (nopal), and N-Acetyl L-Cystine (NAC)) for reducing the effects of alcohol. As disclosed herein, various additions, modifications and structural changes may be made to the exemplary composition without departing from the inventive concept.

In one embodiment, a composition to be ingested to counteract the effects of alcohol and provide hydration is provided. The composition may include about 10% by weight of sunflower lecithin powder; about 2.55% by weight of sodium chloride salt; about 25% by weight of potassium salt; about 25% by weight of sugar; about 1.4% by weight of flavor masking agent; about 2.5% by weight of N-acetyl cysteine; about 1.9% by weight of prickly pear cactus; about 2.5% by weight of dihydromyricetin; about 6% by weight of Acerola Extract about 0.01% by weight of pyridoxine hydrochloride; about 0.000025% by weight of methylcobalamin; about 3% by weight of glycerin; about 0.05% by weight of sorbic acid; about 0.1% by weight of potassium sorbate; and about 34.2% by weight of water.

In yet another embodiment, a composition to be ingested to counteract the effects of alcohol and provide hydration is provided. The composition consists essentially of about 10% by weight of sunflower lecithin powder; about 2.55% by weight of sodium chloride salt; about 25% by weight of potassium salt; about 25% by weight of sugar; about 1.4% by weight of flavor masking agent; about 2.5% by weight of N-acetyl cysteine; about 1.9% by weight of prickly pear cactus; about 2.5% by weight of dihydromyricetin; about 6% by weight of Acerola Extract about 0.01% by weight of pyridoxine hydrochloride; about 0.000025% by weight of methylcobalamin; about 3% by weight of glycerin; about 0.05% by weight of sorbic acid; about 0.1% by weight of potassium sorbate; and about 34.2% by weight of water.

The disclosed embodiments, features, and objectives are merely exemplary of the invention.

DETAILED DESCRIPTION

For the purpose of promoting an understanding of the principles of the invention, reference will now be made to embodiments illustrated herein and specific language will be used to describe the same. It will nevertheless be understood that no limitation of the scope of the invention is thereby intended.

The present disclosure discloses a composition (and methods of use thereof) that will counteract the effects of alcohol consumption, while increasing hydration. The composition is intended to be ingested by a human that has consumed or is expected to consume alcohol. The composition also includes a liposome so that the various components of the composition have improved bioavailability and delivery to cells and increased absorption. When mixed with water, the liposome forms a liposomal solution that provides for the improved bioavailability, delivery and absorption characteristics of the composition.

According to one embodiment, a composition to counteract the effects of alcohol is disclosed. The compound includes about 10% by weight of sunflower lecithin powder, about 2.55% by weight of sodium chloride salt, about 25% by weight of potassium salt, about 25% by weight of sugar, about 1.4% by weight of flavor masking agent, about 2.5% by weight of N-acetyl cysteine, about 1.9% by weight of prickly pear cactus, about 2.5% by weight of dihydromyricetin, about 6% by weight of Acerola Extract, about 0.01% by weight of pyridoxine hydrochloride, about 0.000025% by weight of methylcobalamin, about 3% by weight of glycerin, about 0.05% by weight of sorbic acid, about 0.1% by weight of potassium sorbate, and about 34.2% by weight of water.

An embodiment of a method of making a composition to counteract the effects of alcohol is also disclosed herein. The method includes the steps of mixing about 34.2% by weight of water, about 3% by weight of glycerin, about 0.05% by weight of sorbic acid, and about 0.1% by weight of potassium sorbate to create a first mixture and mixing about 10% by weight of sunflower lecithin powder, about 2.55% by weight of sodium chloride salt, about 25% by weight of potassium salt, about 25% by weight of sugar, about 2.5% by weight of N-acetyl cysteine, about 1.9% by weight of prickly pear cactus, about 2.5% by weight of dihydromyricetin, about 6% by weight of acerola extract, about 0.01% by weight of pyridoxine hydrochloride, and about 0.000025% by weight of methylcobalamin to the first mixture to create a final mixture.

Dihydromyricetin (DHM) is a flavonoid isolated from various plant species traditionally used to counter act the effects of alcohol. It has been demonstrated that DHM may exhibit protective effects against alcohol consumption and alcohol tolerance. (Li H, Li Q, Liu Z, Yang K, Chen Z, Cheng Q, Wu L. *The Versatile Effects of Dihydromyricetin in Health*. Evid Based Complement Alternat Med. 2017; 2017: 1053617. doi: 10.1155/2017/1053617. Epub 2017 Aug. 30. PMID: 28947908; PMCID: PMC5602609). A specific study demonstrated that DMH is highly effective in counteracting acute ethanol intoxication and suggests that DHM effectively ameliorates moderate to high-dose ethanol intoxication even when it is administered 30 min before or 30 min after ethanol exposure (Shen Y, Lindemeyer A K, Gonzalez C, Shao X M, Spigelman I, Olsen R W, Liang J. *Dihydromyricetin as a novel anti-alcohol intoxication medication*. J Neurosci. 2012 Jan. 4; 32(1):390-401. doi: 10.1523/JNEUROSCI.4639-11.2012. PMID: 22219299; PMCID: PMC3292407). DHM is also known to have hepatoprotective effects (Skotnicová A, Boubínová G, Boštíková Z, Dušková Š, Šulc M, Kutinová-Canová N, Mráz J, Hodek P. *Does dihydromyricetin impact on alcohol metabolism*. Physiol Res. 2020 Dec. 31; 69(Suppl 4):S573-S581. doi: 10.33549/physiolres.934606. PMID: 33656905; PMCID: PMC8603706).

The prickly pear cactus is known to also aid in counter acting the effects of alcohol, including an alcohol hangover. (Wiese J, McPherson S, Odden M C, Shlipak M G. *Effect of Opuntia ficus indica on symptoms of the alcohol hangover*. Arch Intern Med. 2004 Jun. 28; 164(12):1334-40. doi: 10.1001/archinte.164.12.1334. PMID: 15226168).

Similarly N-Acetyl L-Cystine (NAC) is known to reduce hangover symptoms (Coppersmith V, Hudgins S, Stoltzfus J, Stankewicz H. The use of N-acetylcysteine in the prevention of hangover: a randomized trial. Sci Rep. 2021 Jun. 28; 11(1):13397. doi: 10.1038/s41598-021-92676-0. Erratum in: Sci Rep. 2021 Jul. 21; 11(1):15262. PMID: 34183702; PMCID: PMC8238992). NAC significantly protects against acute ethanol-induced liver damage in a dose-independent manner.

As disclosed herein, Dihydromyricetin (DMH), prickly pear cactus (nopal), and N-Acetyl L-Cystine (NAC) have been combined together in a unique way to provide a high performing supplement. The ingredients are combined in a way that ensures that the resulting compound maximizes the effectiveness of each of these ingredients functioning together to reduce any adverse effects of alcohol.

The disclosed compound is a dihydromyricetin (DMH), prickly pear cactus (nopal), and N-Acetyl L-Cystine (NAC) powder, in combination with additional ingredients, to provide a product for use in counteracting the effects of alcohol consumption, while increasing hydration with electrolytes, sugar and water. An exemplary formulation (Example 1) of such a compound or composition is shown in Table 1 below.

Formulation

Example 1

TABLE 1

| ACTIVE COMPONENTS | Percent (% Weight) | Type of Component and/or Functional Benefits |
| --- | --- | --- |
| Alcolec H 20 | 10.0 | Lecithin Liposomes |
| Irish Mineral Sea Salt | 2.55 | Electrolytes |
| Tri Potassium Citrate | 2.8 | |
| Organic Cane Sugar | 25.0 | Water multiplier |
| Clear Mask 201 NMP | 0.80 | Flavor masks |
| Flavor Masking Agent | 0.60 | |
| N-Acetyl L-Cysteine | 2.5 | Reduce the effect of alcohol |
| Prickly Pear Cactus | 1.9 | |
| DHM 98% | 2.5 | |
| Acerola Extract (25% Vitamin C) | 6.0 | Vitamin C |
| Pyridoxine HCL (B6) | 0.01 | Vitamin B6 |
| Vitamin B12 (as methylcobalamin) | 0.000025 | Vitamin B12 |
| GLYCERINE 99.7% | 3.0 | Process aid |
| Sorbic Acid | 0.05 | Preservatives |
| Potassium Sorbate | 0.10 | |
| Flavor Extract | 8.0 | Flavor |
| USP Water | 34.2 | Water |

The compound outlined in Table 1 is a composition that includes electrolytes and sugar for improving hydration along with certain ingredients to reduce the effects of alcohol. The composition or compound is also made with lecithin that provides the benefit of liposomes, which provides for improved and rapid absorption into the human body.

The following description describes the benefits and/or functions of each ingredients listed in Table 1.

Alcolec® H20 is a lecithin containing phosphatidic choline. Lecithin is a naturally occurring fatty substance that is commonly found in various plant and animal tissues. It is composed of phospholipids (e.g. phosphatidic choline) which may improve absorption of minerals into the human body.

Irish Mineral Sea Salt contains various minerals, including sodium and potassium, which are essential electrolytes. Consuming electrolytes may aid in rehydration and help counteract dehydration caused by alcohol consumption.

Tri Potassium Citrate is a potassium salt of citric acid. It provides a source of potassium, which is an important electrolyte that may help replenish lost nutrients and alleviate hangover symptoms related to dehydration.

Cane sugar provides carbohydrates that may help restore energy levels to counter the effects of dehydration. Furthermore, glucose may help with the absorption of water. The osmotic effect of glucose helps to increase the absorption of water from the intestines into the bloodstream. This increased absorption is particularly important in cases of dehydration or when the body needs to rehydrate quickly. Glucose may also provide for faster absorption of electrolytes which may help in water retention and thus restore hydration levels.

N-Acetyl L-Cysteine (NAC) and prickly pear cactus, as mentioned earlier in the description, have been found to alleviate the effects of hangovers and potentially protect the body from the harmful consequences of alcohol consumption. NAC, a compound known for its ability to boost glutathione levels, acts as a potent antioxidant in the liver. Glutathione plays a critical role in neutralizing reactive oxygen species and shielding liver cells from oxidative stress induced by alcohol metabolism. By supporting the liver's antioxidant defenses, NAC shows promise in mitigating alcohol-induced liver damage. Prickly pear cactus, as noted above, contains the potential in reducing inflammation and oxidative stress, which are exacerbated by alcohol consumption. Given that alcohol may lead to increased oxidative stress in the liver, the anti-inflammatory properties of prickly pear cactus are particularly noteworthy as they may contribute to protecting the liver from alcohol-induced damage.

Acerola Extract contain vitamin C. Vitamin C is an antioxidant that may help reduce oxidative stress caused by alcohol consumption.

Vitamin B6 and B12 are crucial vitamins that may be depleted by alcohol consumption. Therefore, it is essential to replenish these vitamins to support the body's needs.

The compound shown in Table 1 is produced by the following steps: USP water is weighed into a vessel. The following components are added to the vessel: glycerin, sorbic acid, potassium sorbate, flavor masking agent, and a flavor extract. The vessel is mixed and while mixing the following components are added: Irish mineral sea salt, tri potassium citrate, organic cane sugar, clear mask 201 NMP, N-Acetyl L-Cysteine, prickly pear cactus, Acerola extract (25% Vitamin C), Pyridoxine HCL (B6), and Vitamin B12 (as methylcobalamin). Dihydromyricetin, DHM, and Lecithin are added after the above listed components are mixed together.

In alternative embodiments, the Irish Mineral Sea Salt may be replaced by another sodium chloride containing salt. For example, Himalayan salt, Hawaiian salt, Sea salt, Pure salt (i.e. pure table salt), or other edible compound composes of both Sodium and Chloride may be employed.

In alternative embodiments, the Tri Potassium Citrate may be replaced by another Potassium salt. For example, Potassium Chloride, Potassium Aspartate, Potassium Glycinate, Potassium Citrate, Potassium Bicarbonate, Potassium Gluconate, or other edible compound providing a source of Potassium may be employed.

In alternative embodiments, another flavor mask may be employed. Flavor masking agents are food additives that are used to mask unpleasant flavors in food products. The preferred embodiment disclosed above includes the preferred flavor mask, but other alternatives are currently available.

The term "alcohol" as used herein refers to ethyl alcohol and "alcoholic beverages" and refers to popular spirits or blends that are intended for human consumption.

All publications disclosed herein are incorporated by reference to the same extent as if each individual publication was specifically and individually indicated to be incorporated by reference. It is to be understood that while a certain form of the invention is described, it is not intended to be limited to the specific form or arrangement herein described. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The compositions, formulations, methods, and techniques described herein are intended to be exemplary and are not intended as limitations on the scope. Although the invention has been described in connection with specific embodiments, it should be understood that the invention as ultimately claimed should not be unduly limited to such specific embodiments.

What is claimed is:

1. A composition to be ingested to counteract the effects of alcohol and provide hydration comprising:
    about 10% by weight of sunflower lecithin powder;
    about 2.55% by weight of sodium chloride salt;
    about 25% by weight of potassium salt;
    about 25% by weight of sugar;
    about 2.5% by weight N-acetyl cysteine;
    about 1.9% by weight prickly pear cactus; and
    about 2.5% by weight dihydromyricetin.

2. The composition of claim 1, further comprising about 1.4% by weight of flavor masking agent.

3. The composition of claim 1, further comprising about 6% by weight of acerola extract.

4. The composition of claim 1, further comprising about bout 0.01% by weight of pyridoxine hydrochloride.

5. The composition of claim 1, further comprising about 0.000025% by weight of methylcobalamin.

6. The composition of claim 1, further comprising about 3% by of weight glycerin.

7. The composition of claim 1, further comprising about 0.05% by weight of sorbic acid.

8. The composition of claim 1, further comprising about 0.1% by weight of potassium sorbate.

9. The composition of claim 1, further comprising about 34.2% by weight of water.

10. The composition of claim 1, wherein the sodium chloride salt includes at least one of Irish mineral sea salt, Himalayan salt, Hawaiian salt, sea salt, or pure table salt.

11. The composition of claim 1, wherein the potassium salt includes at least one of Potassium Chloride, Potassium Aspartate, Potassium Glycinate, Potassium Citrate, Potassium Bicarbonate, or Potassium Gluconate.

12. A composition to be ingested to counteract the effects of alcohol and provide hydration consisting essentially of:
    about 10% by weight of sunflower lecithin powder;
    about 2.55% by weight of sodium chloride salt;
    about 25% by weight of potassium salt;
    about 25% by weight of sugar;
    about 1.4% by weight of flavor masking agent;
    about 2.5% by weight of N-acetyl cysteine;
    about 1.9% by weight of prickly pear cactus;
    about 2.5% by weight of dihydromyricetin;
    about 6% by weight of Acerola Extract about 0.01% by weight of pyridoxine hydrochloride;
about 0.000025% by weight of methylcobalamin;
about 3% by weight of glycerin;
about 0.05% by weight of sorbic acid;
about 0.1% by weight of potassium sorbate; and
about 34.2% by weight of water.

13. The composition of claim 12, wherein the sodium chloride salt includes at least one of Irish mineral sea salt, Himalayan salt, Hawaiian salt, sea salt, or pure table salt.

14. The composition of claim 12, wherein the potassium salt includes at least one of Potassium Chloride, Potassium Aspartate, Potassium Glycinate, Potassium Citrate, Potassium Bicarbonate, or Potassium Gluconate.

15. A method of making a composition to protect from and counteract the effects of alcohol and provide hydration, the method comprising the steps of:
    mixing about 34.2% by weight of water, about 3% by weight of glycerin, about 0.05% by weight of sorbic acid, and about 0.1% by weight of potassium sorbate to create a first mixture;
    mixing about 10% by weight of sunflower lecithin powder, about 2.55% by weight of sodium chloride salt, about 25% by weight of potassium salt, about 25% by weight of sugar, about 2.5% by weight of N-acetyl cysteine, about 1.9% by weight of prickly pear cactus, about 2.5% by weight of dihydromyricetin, about 6% by weight of acerola extract, about 0.01% by weight of pyridoxine hydrochloride, and about 0.000025% by weight of methylcobalamin to the first mixture to create a final mixture.

16. The method of claim 15, wherein a flavor masking agent is added to the first or final mixture.

17. The method of claim 15, wherein the sodium chloride salt includes at least one of Irish mineral sea salt, Himalayan salt, Hawaiian salt, sea salt, or pure table salt.

18. The method of claim 15, wherein the potassium salt includes at least one of Potassium Chloride, Potassium Aspartate, Potassium Glycinate, Potassium Citrate, Potassium Bicarbonate, or Potassium Gluconate.

* * * * *